US009115601B2

(12) United States Patent
Maier et al.

(10) Patent No.: US 9,115,601 B2
(45) Date of Patent: Aug. 25, 2015

(54) TURBOMACHINE COMPONENT ALIGNMENT

(71) Applicants: William C. Maier, Almond, NY (US); Patrice LeConte, Sainte Adresse (FR); George M. Lucas, Hammondsport, NY (US)

(72) Inventors: William C. Maier, Almond, NY (US); Patrice LeConte, Sainte Adresse (FR); George M. Lucas, Hammondsport, NY (US)

(73) Assignee: Dresser-Rand Company, Olean, NY (US)

( * ) Notice: Subject to any disclaimer, the term of this patent is extended or adjusted under 35 U.S.C. 154(b) by 362 days.

(21) Appl. No.: 13/680,280

(22) Filed: Nov. 19, 2012

(65) Prior Publication Data

US 2013/0174576 A1    Jul. 11, 2013

Related U.S. Application Data

(60) Provisional application No. 61/583,729, filed on Jan. 6, 2012.

(51) Int. Cl.
*F01D 25/28* (2006.01)
*F02C 7/20* (2006.01)
*F01D 25/24* (2006.01)

(52) U.S. Cl.
CPC . *F01D 25/28* (2013.01); *F02C 7/20* (2013.01); *F01D 25/24* (2013.01); *F01D 25/243* (2013.01); *F01D 25/285* (2013.01); *Y10T 29/49879* (2015.01)

(58) Field of Classification Search
CPC ..... F01D 25/243; F01D 25/28; F01D 25/285; F01D 25/24; F02C 7/20
See application file for complete search history.

(56) References Cited

U.S. PATENT DOCUMENTS

| 3,556,672 A * | 1/1971 | Gentile ........................ 415/134 |
| 3,754,833 A * | 8/1973 | Remberg ...................... 415/108 |
| 4,050,660 A * | 9/1977 | Eggmann et al. ............ 248/676 |
| 6,279,309 B1 * | 8/2001 | Lawlor et al. ................. 60/772 |
| 7,581,922 B1 * | 9/2009 | Morimoto et al. ........... 415/126 |
| 2010/0104431 A1 * | 4/2010 | Roy et al. .................. 415/182.1 |
| 2010/0218508 A1 * | 9/2010 | Brown et al. .................. 60/796 |
| 2012/0223467 A1 * | 9/2012 | Swan et al. ..................... 269/37 |

\* cited by examiner

*Primary Examiner* — Craig Kim
(74) *Attorney, Agent, or Firm* — Edmonds & Nolte, PC

(57) ABSTRACT

A rotating machine has a barrel casing and at least one component carrier disposed therein. The component carrier is aligned and supported within the barrel casing using a plurality of carrier alignment fixtures which have alignment shafts that extend through the barrel casing to the component carrier. Each alignment shaft has an eccentric key pin extending from a distal end thereof and an alignment key rotatably-mounted to each eccentric key pin. The alignment keys mate with corresponding keyway slots defined on the component carrier such that when the carrier alignment fixtures are rotated axially, the corresponding alignment keys bias against the keyway slot and shift the position of the component carrier.

20 Claims, 3 Drawing Sheets

TURBOMACHINE COMPONENT ALIGNMENT

BACKGROUND

The present application claims priority to U.S. Application No. 61/583,729 filed Jan. 6, 2012. The priority application is hereby incorporated by reference in its entirety into the present application.

Heat engines are used to convert thermal energy into useful mechanical work and are often used in power generation plants. One common example of a heat engine is an expander-generator system, which generally includes an expander (e.g., a turbine) rotatably coupled to a generator or other power generating device. As working fluids are expanded in the expander, the shaft connecting the turbine and generator rotates and generates electricity in the generator.

Most power plant expander-generators are based on the Rankine cycle and obtain high temperature/pressure working fluids to expand through the combustion of coal, natural gas, oil, and/or nuclear fission. Typical working fluids for Rankine cycles include water (steam) and air. Recently, however, due to perceived benefits in terms of hardware compactness, efficiency, heat transfer characteristics, etc., there has been considerable interest in using super-critical carbon dioxide ($ScCO_2$) as a working fluid for certain expander-generator applications. Notable among such applications are nuclear, solar, and waste heat energy conversion cycles. Most practical waste heat recovery applications using $ScCO_2$, however, end up with a problematic combination of high pressure and relatively high temperature working fluids that are difficult to effectively contain.

One common solution to contain the high pressure and high temperature fluids is installing the expander flowpath components in an unsplit pressure-containing barrel casing. In a typical barrel casing configuration, the internal components are mutually aligned with each other, both axially and radially, by concentric circumferential fits against the inner surface of the barrel casing. This solution is effective for high pressure applications, but only for modest temperatures (e.g., below 600° F.). At higher temperature conditions, the barrel casing design becomes problematic because of non-uniform thermal growth and relative movement of the different internal components inside the casing, as well as movement of the barrel casing itself. These are all the result of potentially significant differences in temperature between components. Consequently, traditional barrel casing mounting often leads to unwanted misalignment, rubbing, and/or binding of stationary and static flowpath components in both transient (i.e., startup, shutdown, and load-change conditions) and steady-state operating conditions.

What is needed, therefore, is a system and method that allows for both high pressure containment in expander-generators, and alignment and ease of adjustment of the internal components for higher temperature applications.

SUMMARY

Embodiments of the disclosure may provide a rotating machine that includes a barrel casing having a plurality of cylindrical bores extending between outer and inner circumferential surfaces of the barrel casing. A component carrier may be disposed within the barrel casing and define a plurality of keyway slots. A plurality of carrier alignment fixtures may be arranged about the outer circumferential surface of the barrel casing. Each carrier alignment fixture may have an alignment shaft that extends through a corresponding one of the plurality of cylindrical bores. An eccentric key pin may extend from a distal end of each alignment shaft. An alignment key may be rotatably-mounted to each eccentric key pin of each corresponding carrier alignment fixture and configured to mate with a corresponding one of the plurality of keyway slots. Rotation of each carrier alignment fixture about a central axis of each corresponding alignment shaft may adjust a position of the component carrier with respect to the barrel casing.

Embodiments of the disclosure may further provide a carrier alignment fixture for mounting and aligning an internal component of a barrel casing. The carrier alignment fixture may include an alignment flange defining a plurality of circumferentially-arrayed apertures. An alignment shaft having a first central axis may extend from the alignment flange. A key pin may extend from a distal end of the alignment shaft and have a second central axis eccentric to the first central axis. An alignment key may be rotatably-mounted to the key pin.

Embodiments of the disclosure may further provide a method for aligning and supporting a component carrier disposed within a barrel casing. The exemplary method may include inserting an alignment shaft of a plurality of carrier alignment fixtures into a corresponding cylindrical bore defined the barrel casing. Each alignment shaft may have an eccentric key pin that extends from a distal end of the alignment shaft and an alignment key rotatably-mounted on each eccentric key pin. The method may further include inserting each alignment key into corresponding keyway slots defined in the component carrier and adjustably rotating each carrier alignment fixture about a central axis of each alignment shaft. The method may further include engaging each alignment key with the corresponding keyway slot to adjust a position of the component carrier with respect to the barrel casing and securing the plurality carrier alignment fixtures to the barrel casing to support the component carrier therein.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
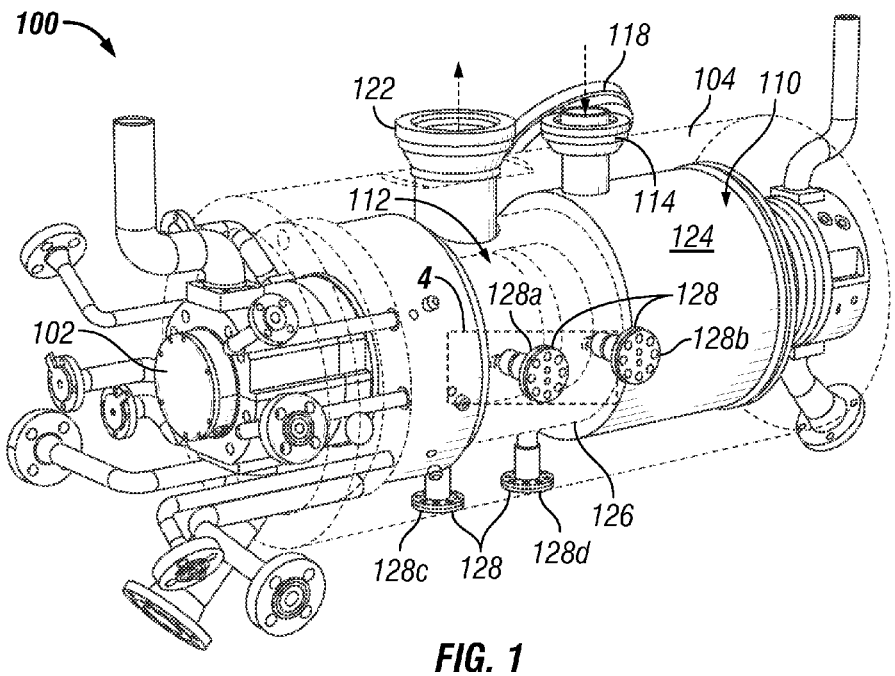
FIG. 1 illustrates an isometric view of an exemplary rotating machine, according to one or more embodiments disclosed.

It is to be understood that the following disclosure describes several exemplary embodiments for implementing different features, structures, or functions of the inventions. Exemplary embodiments of components, arrangements, and configurations are described below to simplify the present disclosure; however, these exemplary embodiments are provided merely as examples and are not intended to limit the scope of the inventions. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the inventions, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
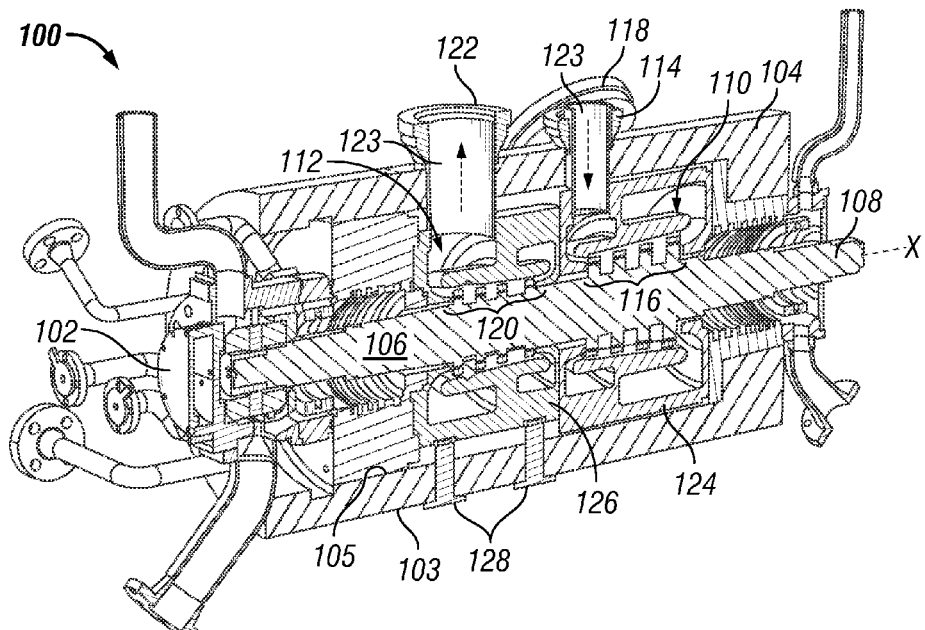
FIG. 2 illustrates a cross-sectional view of the rotating machine of FIG. 1.

FIGS. 1 and 2 illustrate an isometric view and a cross-sectional view, respectively, of an exemplary rotating machine 100, according to one or more embodiments disclosed. The rotating machine 100 includes an expander 102 arranged within a barrel casing 104. In other embodiments, the expander 102 may be replaced with any other type of rotating machinery, such as a compressor or a pump, or a combination expander/compressor or expander/pump. As depicted, the barrel casing 104 is an unsplit, cylindrical, pressure-containing expander casing that has an outer circumferential surface 103 and an inner circumferential surface 105. The barrel casing 104 receives the expander 102 therein in a sleeve-and-insert combination such that the expander 102 is generally arranged adjacent the inner circumferential surface 105. In other embodiments, however, the barrel casing 104 may be split horizontally for ease of access to the internal components.

A shaft 106 extends substantially from one end of the barrel casing 104 to the other and rotates about a central axis X. A free end 108 of the shaft 106 may penetrate the barrel casing 104 at one end thereof in order to be operatively coupled to a load receiving device (not shown) that absorbs the rotational energy of the shaft 106. The load receiving device may include a pump, a mill, a compressor, a gearbox, a generator for creating electricity, combinations thereof, or the like.

The expander 102 may be a turbo-expander configured to extract energy from a high pressure and temperature working fluid and transmit that energy to the shaft 106 in the form of torque and rotational speed. As illustrated, the expander 102 is a four-stage, two-flow, axial flow expander, having a first internal expansion component 110 arranged axially-adjacent a second internal expansion component 112. In other embodiments, the expander 102 may be any other type of expansion device configured to extract energy from a working fluid. For example, the expander 102 may be a radial flow expander, or may include only a single internal expansion component or otherwise include different expander stage counts, different numbers of working fluid flows, etc., without departing from the scope of the disclosure.

The term "working fluid" is not intended to limit the state or phase of the working fluid. Rather, the working fluid may be in a gas phase, a super-critical state, a sub-critical state, combinations thereof, or any other phase or state. In one embodiment, the working fluid is water (e.g., steam) or air. In other embodiments, the working fluid is carbon dioxide ($CO_2$), such as super-critical carbon dioxide ($ScCO_2$). The term "carbon dioxide" is not intended to be limited to a $CO_2$ of any particular type, purity, or grade. For example, industrial grade $CO_2$ may be used as the working fluid.

A first inlet 114 is defined in the barrel casing 104 and fluidly communicates working fluid to the first internal expansion component 110 where the working fluid is expanded across a first set of expansion stages 116 and subsequently discharged via a first outlet 118. A second inlet (not shown) is also defined in the barrel casing 104 and fluidly communicates working fluid to the second internal expansion component 112, where the working fluid is expanded across a second set of expansion stages 120 and ultimately discharged via a second outlet 122. Accordingly, the working fluid flows in each expansion component 110, 112 proceed in opposite axial directions toward the axial extents of the expander 102. Embodiments contemplated herein, however, also include other flow path configurations, such as single flow path configurations where only a single flow of working fluid is expanded in a single axial direction.

Each inlet and outlet 114, 118, 122 of the rotating machine 100 may include a transfer tube 123 adapted to transfer the working fluid to and from the first and second internal expansion components 110, 112. Each transfer tube 123 forms a sealed connection with the corresponding first and second internal expansion components 110, 112. The transfer tubes 123 also form a sealed connection with a portion of the barrel casing 104, such as at the bores defined in the casing 104 that accommodate each inlet and outlet 114, 118, 122 or some portion of the inlet or discharge nozzle bores. This sealing may be accomplished, for example, with piston rings at each end of the transfer tube 123. Moreover, the ends of each transfer tube 123 may be radiused in a "dog-bone" shape to allow a small amount of movement and to facilitate easy assembly.

The individual expansion stages (not individually numbered) of the expansion components 110, 112 each generally include a stator vane mounted in an annular pressure-containing diaphragm and followed axially by a rotating blade mounted on the outer radial extent of a disk-shaped wheel. The wheel is, in turn, mounted on the shaft 106 for rotation, and may be integrally-formed therewith in at least one embodiment. The pressure-containing diaphragm of the first internal expansion component 110 is mounted in a first component carrier 124, and the pressure-containing diaphragm of the second internal expansion component 112 is mounted in a second component carrier 126. Each component carrier 124, 126 is generally annular and mounted co-axially within the barrel casing 104 adjacent the inner circumferential surface 105 thereof such that the component carriers 124, 126 are mutually aligned both axially and radially with respect to the central axis X.

Unless the component carriers 124, 126 are properly mounted within the barrel casing 104, non-uniform thermal growth and relative movement of the carriers 124, 126 and/or the casing 104 can result in misalignment, rubbing, and/or binding of the stationary and static flow path components. To ensure proper alignment, a plurality of radially-oriented carrier alignment fixtures 128 is used. The carrier alignment fixtures 128 facilitate the radial and axial alignment of the component carriers 124, 126 not only with each other but also with the shaft 106 and the barrel casing 104. Accordingly, the carrier alignment fixtures 128 maintain the component carriers 124, 126 at a safe, spaced distance from each other to the extent possible while simultaneously preserving the functionality of the expander 102.

In FIGS. 1 and 2, the carrier alignment fixtures 128, such as fixtures 128a, 128b, 128c, and 128d, are shown mounting or otherwise aligning only the second component carrier 126 within the barrel casing 104. It will be appreciated, however, that additional alignment fixtures (not shown) can also be used to mount or otherwise align the first component carrier 124 within the barrel casing 104, or both component carriers 124, 126 simultaneously, without departing from the scope of the disclosure. Accordingly, while the discussion below is directed primarily to mounting and aligning the second component carrier 126, the discussion is equally applicable to mounting and aligning the first component carrier 124, or any other internal component of the rotating machine 100.

The second component carrier 126 is supported on at least six carrier alignment fixtures 128 (only fixtures 128a-d illustrated in FIG. 1). Four of the carrier alignment fixtures 128, including fixtures 128a and 128b, are arrayed along a horizontal plane at the central axis X of the shaft 106 on opposing sides of the rotating machine 100. And two of the carrier alignment fixtures 128, including fixtures 128c and 128d, are positioned in an orthogonal vertical plane also through the central axis X, but at the bottom dead center position. The carrier alignment fixtures 128 are generally arranged at the axial extents of the second component carrier 126 and are aligned along radial lines though the central axis X of the shaft 106. It will be appreciated that more or less than six carrier alignment fixtures 128 may be used, without departing from the scope of the disclosure.

Figure 3:
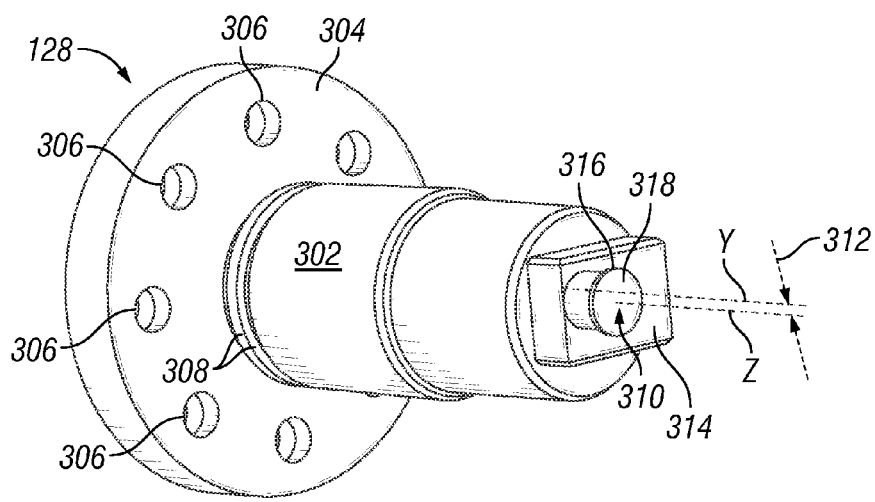
FIG. 3 illustrates an exemplary carrier alignment fixture, according to one or more embodiments disclosed.

Referring to FIG. 3, illustrated is an exemplary carrier alignment fixture 128, according to one or more embodiments disclosed. The fixture 128 includes an alignment shaft 302 coupled to or otherwise extending from an alignment flange 304. The alignment flange 304 defines a series of circumferentially-arrayed apertures 306 which facilitate attachment to the barrel casing 104 with mechanical fasteners, as will be described below. The alignment shaft 302 defines one or more seal grooves 308 that can accommodate one or more seals (not shown), such as o-rings, in order to seal the barrel casing 104 around the shaft 302, as will also be described below.

The alignment shaft 302 has a central axis Y and includes a key pin 310 that protrudes from the distal end of the alignment shaft 302 (e.g., opposite the alignment flange 304). The key pin 310 is generally aligned with, but eccentric to, the central axis Y of the alignment shaft 302. Accordingly, the key pin 310 has a separate central axis Z that is slightly offset by a distance 312 from the central axis Y of the alignment shaft 302. In one embodiment, the central axis Y is offset 312 from the central axis Z by approximately one-half the overall alignment adjustment desired for the internal components of the rotating machine 100. For example, the offset 312 may be about 0.020 to about 0.100 inches, but may be more or less without departing from the scope of the disclosure.

An alignment key 314 is rotatably-mounted to the key pin 310 through a central hole 316 defined in the alignment key 314. As illustrated, the alignment key 314 may be a generally rectangular block, but may also be of other geometric shapes. A slight annular clearance is provided between the outside diameter of the key pin 310 and the inside diameter of the central hole 316 such that the alignment key 314 is allowed to freely rotate about the central axis Z of the key pin 310. The alignment key 314 is retained axially on the key pin 310 using a key retainer 318, which may be welded, brazed, bolted, or otherwise fixed to the distal end of the key pin 310 by any known fastening or attachment method.

Figure 4:
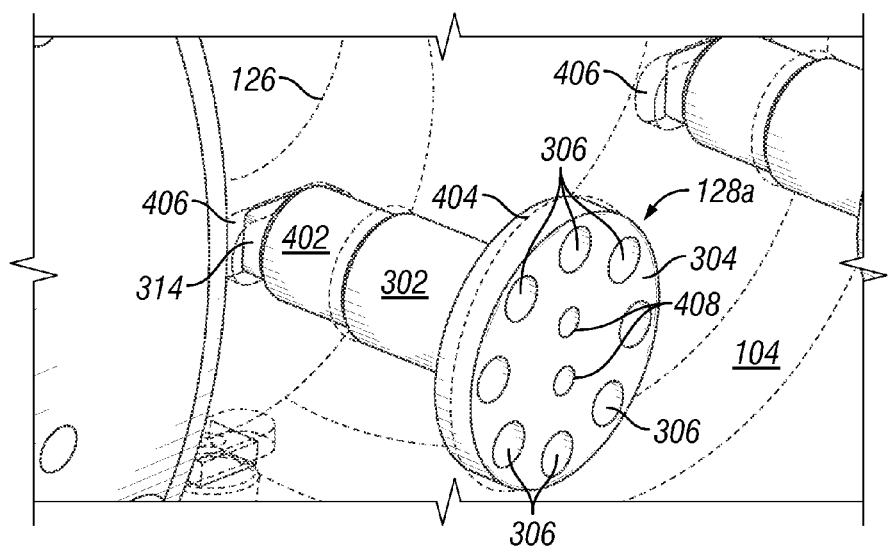
FIG. 4 illustrates in isometric view of a portion of the rotating machine shown in FIG. 1.

Referring to FIG. 4, illustrated is a portion of the rotating machine 100, as designated by the dashed box depicted in FIG. 1. Specifically, illustrated is the first carrier alignment fixture 128a as installed on the rotating machine 100. In cooperation with the other carrier alignment fixtures 128b-d, including those not specifically illustrated in FIG. 1, the first carrier alignment fixture 128a is configured to mount and facilitate alignment of the second component carrier 126 within the barrel casing 104. Consequently, discussion below regarding the first carrier alignment fixture 128a is equally applicable to the remaining fixtures 128b-d, and those not specifically illustrated in FIG. 1.

To install the first carrier alignment fixture 128a, the alignment shaft 302 is inserted or otherwise extended into a cylindrical bore 402 defined in the barrel casing 104. The cylindrical bore 402 extends from the outer circumferential surface 103 of the casing 104 to its inner circumferential surface 105 (FIG. 2), and thereby provides access for the fixture 128a to the second component carrier 126. The joint between the alignment shaft 302 and the cylindrical bore 402 may be generally sealed via the one or more seal grooves 308 (FIG. 3) defined on the shaft 302. For example, the shaft 302 may be sealed at the seal grooves 308 with a series of elastomeric or metallic o-rings, or other appropriate seal types.

Using the apertures 306 defined in the alignment flange 304, the first carrier alignment fixture 128a may be mechanically-fastened to the barrel casing 104 with a series of bolts, studs/nuts, and/or other known mechanical fasteners (not shown). In one embodiment, the alignment flange 304 is fastened directly to the outer circumferential surface 103 (FIG. 2) of the barrel casing 104. As illustrated in FIG. 4, however, the alignment flange 304 may be seated at least partially within a recess 404 defined in the outer circumferential surface 103 and fastened thereto with the bolts, studs/nuts, and/or the other known mechanical fasteners.

The second component carrier 126 defines a plurality of keyway slots 406 (two are shown in FIG. 4) configured to receive the alignment key 314 from its corresponding carrier alignment fixture 128. Accordingly, each keyway slot 406 defined in the second component carrier 126 is matched with a corresponding carrier alignment fixture 128. Each alignment key 314 is inserted into and freely engages the corresponding keyway slot 406 such that the second component carrier 126 is able to be shifted in both radial and axial directions while maintaining alignment with the central axis X of the shaft 106 (FIG. 1). As can be appreciated, this can prove advantageous if the second component carrier 126 experiences non-uniform thermal growth which would otherwise misalign and/or bind its stationary and static flow path components against other internal components, such as the first component carrier 124 or the shaft 106, or against the inner circumferential surface 105 (FIG. 2) of the barrel casing 104.

Figure 5:
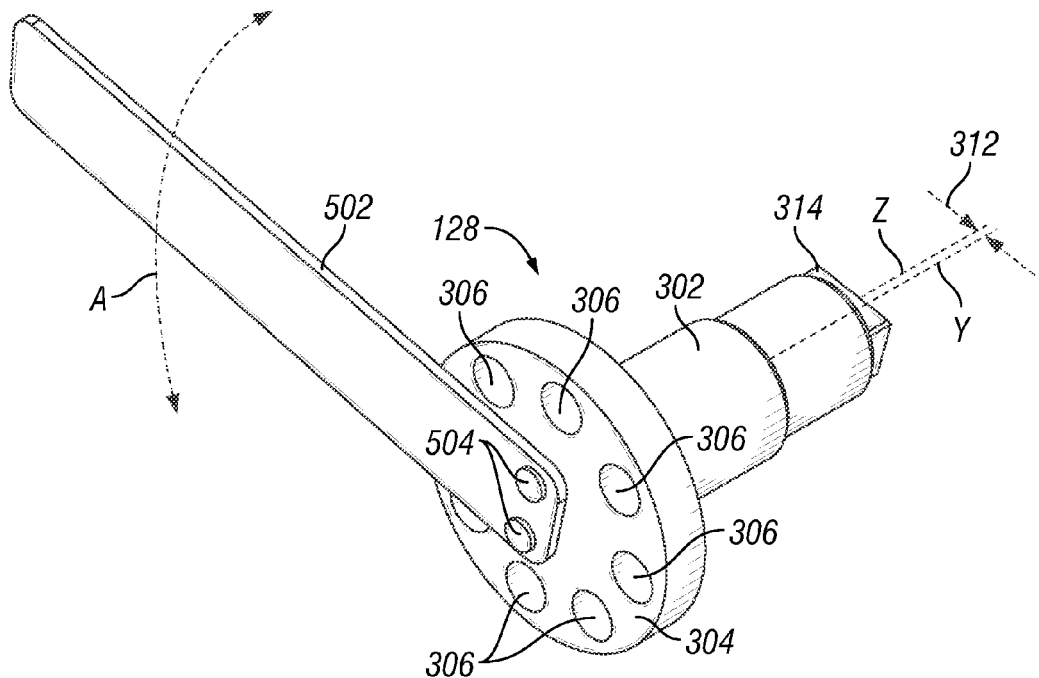
FIG. 5 illustrates a carrier alignment fixture with an exemplary alignment adjustment tool, according to one or more embodiments disclosed.

Since each alignment key 314 is mounted on a key pin 310 (FIG. 3) that has a central axis Z eccentric to the central axis Y of the alignment shaft 302, external adjustment of the axial and radial positions of the second component carrier 126 can readily be accomplished. For example, referring to FIG. 5, with continued reference to FIG. 4, illustrated is an alignment adjustment tool 502 that can be coupled to the alignment flange 304 in order to manipulate the rotational position of the carrier alignment fixture 128. The alignment adjustment tool 502 may be any type of tool configured to provide torque or rotational movement to the carrier alignment fixture 128. In one embodiment, the alignment adjustment tool 502 is a hand spanner wrench, but may be any other type of suitable torque wrench, without departing from the scope of the disclosure.

One or more tool engagement holes 408 (FIG. 4) may be defined on the alignment flange 304 and used to couple the alignment adjustment tool 502 to the carrier alignment fixture 128. Corresponding pins or studs 504 (FIG. 5) are inserted into the tool engagement holes 408 to secure the alignment adjustment tool 502 to the alignment flange 304, and thereby providing a pivot point for rotating the carrier alignment fixture 128. As will be appreciated, however, the alignment adjustment tool 502 may be coupled to the alignment flange 304 in any known manner, as long as the tool 502 is able to adequately rotate the carrier alignment fixture 128 about its central axis Y.

External adjustment of the axial and radial positions of the second component carrier 126 is realized by rotating the alignment adjustment tool 502 in the directions shown by arrow A. Clocking the carrier alignment fixture 128 to different bolt-to-hole alignment configurations about the central axis Y forces the eccentric key pin 310, and thus the alignment key 314, to a greater or lesser offset 312 position relative to the central axis Y. As the alignment key 314 moves, it engages its corresponding keyway slot 406 and thereby forces the second component carrier 126 into a new position relative to the barrel casing 104. Accurate alignment of the second component carrier 126 may be monitored optically using mirrors or boroscopes, or by using instruments such as proximity probes, linear variable differential transformers, or other suitable measurement devices. Once the second component carrier 126 is properly aligned, the carrier alignment fixture 128 is once again mechanically-fastened to the barrel casing 104, as described above, in order to hold the second component carrier 126 in place. The same process is undertaken at each carrier alignment fixture 128 until the second component carrier 126 is aligned as desired.

Having individual, externally-installed carrier alignment fixtures 128 provides several benefits to the rotating machine 100. For example, it eliminates difficult machining or installation of support features on the inner circumferential surface 105 (FIG. 2) of the barrel casing 104. Also, the inner components, such as the first and second component carriers 124, 126 can be bundled in a loose assembly and drawn into the barrel casing 104 in a unit or cartridge, as is typical of barrel-type pumps or compressors. Because the carrier alignment fixtures 128 are entirely withdrawn from the barrel casing 104 during assembly, the process can be done in an expeditious manner without risk of binding or damage to support features on either the cartridge or the casing 104.

Again, while the description above focuses primarily on aligning and supporting the second component carrier 126 within the barrel casing 104, it should be appreciated that the carrier alignment fixtures 128 can be equally used to support the first component carrier 124, or any other internal components or cartridges of the rotating machine 100. Moreover, while the disclosure is generally described with reference to a $ScCO_2$ expander 102, the inventive concept could equally be adapted for use in any turbomachine where relative differential movement of internal components must be taken into account. For instance, the mounting and aligning advantages of the carrier alignment fixtures 128 may likewise be employed in a high-pressure pump or compressor unit.

While not specifically illustrated herein, it is also contemplated to use an additional carrier alignment fixture to positionally fix the first or second component carriers 124, 126 axially with respect to the barrel casing 104 and other internal components. The additional carrier alignment fixture is again projected through the barrel casing 104 and through a radial line toward the central axis X of the shaft 106. The alignment key 314 and mating keyway slot 406 for this additional fixture are oriented perpendicular to the axial direction of the rotating machine 100 to provide positional constraint on the first or second component carriers 124, 126 while still allowing free movement due to the thermal or pressure distortions of the first or second component carriers 124, 126 and the barrel casing 104.

Figure 6:
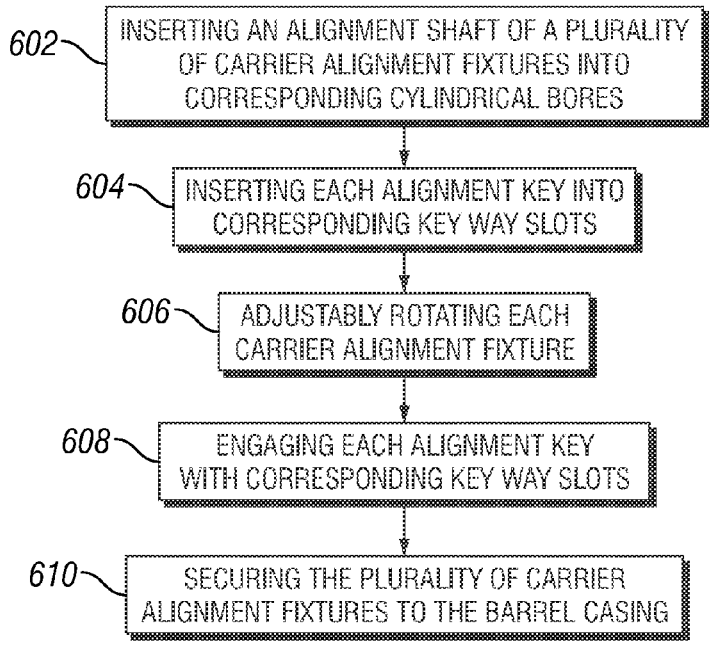
FIG. 6 illustrates a schematic of a method for aligning and supporting a component carrier disposed within a barrel casing, according to one or more embodiments disclosed.

Referring now to FIG. 6, illustrated is a schematic for a method 600 for aligning and supporting a component carrier disposed within a barrel casing. The method 600 includes inserting an alignment shaft of a plurality of carrier alignment fixtures into corresponding cylindrical bores defined the barrel casing, as at 602. Each alignment shaft has an eccentric key pin extending from a distal end thereof, and an alignment key is rotatably-mounted on each eccentric key pin. Each alignment key is then inserted into corresponding keyway slots defined in the component carrier, as at 604. The carrier alignment fixtures are then adjustably rotated about a central axis of each alignment shaft, as at 606. The method 600 further includes engaging each alignment key with the corresponding keyway slots, as at 608, in order to adjust a position of the component carrier with respect to the barrel casing. The plurality carrier alignment fixtures are secured to the barrel casing to support the component carrier therein, as at 610.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A rotating machine, comprising:
   a barrel casing having a plurality of cylindrical bores extending between outer and inner circumferential surfaces of the barrel casing;
   a component carrier disposed within the barrel casing and defining a plurality of keyway slots;
   a plurality of carrier alignment fixtures arranged about the outer circumferential surface of the barrel casing, each carrier alignment fixture having an alignment shaft extending through a corresponding one of the plurality of cylindrical bores and having an eccentric key pin extending from a distal end of each alignment shaft; and an alignment key rotatably-mounted to each eccentric key pin of each corresponding carrier alignment fixture and configured to mate with a corresponding one of the plurality of keyway slots, whereby rotation of each carrier alignment fixture about a central axis of each corresponding alignment shaft adjusts a position of the component carrier with respect to the barrel casing.

2. The rotating machine of claim 1, wherein the barrel casing is unsplit and cylindrical.

3. The rotating machine of claim 1, further comprising a fluid expander component mounted within the component carrier.

4. The rotating machine of claim 1, further comprising a shaft arranged for rotation within the barrel casing, the shaft having a free end that penetrates the barrel casing at one end of the barrel casing and is coupled to a load receiving device.

5. The rotating machine of claim 1, wherein each carrier alignment fixture further comprises an alignment flange coupled to a corresponding alignment shaft thereof, each alignment flange defining a series of apertures configured to receive mechanical fasteners for attaching the corresponding carrier alignment fixtures to the barrel casing.

6. The rotating machine of claim 5, wherein the barrel casing defines a plurality of recesses and each of the plurality of alignment flanges is seated within one of the plurality of recesses.

7. The rotating machine of claim 1, further comprising one or more grooves defined on each alignment shaft to accommodate a seal between each of the plurality of alignment shafts and a corresponding one of the plurality of cylindrical bores.

8. The rotating machine of claim 1, wherein the alignment key of each carrier alignment fixture is a rectangular block.

9. The rotating machine of claim 8, wherein the alignment key of each carrier alignment fixture is retained axially on its corresponding key pin using a key retainer.

10. A carrier alignment fixture for mounting and aligning an internal component of a barrel casing, comprising:
an alignment flange defining a plurality of circumferentially-arrayed apertures;
an alignment shaft extending from the alignment flange and having a first central axis;
a key pin extending from a distal end of the alignment shaft and having a second central axis eccentric to the first central axis; and
an alignment key rotatably-mounted to the key pin.

11. The carrier alignment fixture of claim 10, further comprising one or more grooves defined on the alignment shaft to seal between the alignment shaft and the barrel casing.

12. The carrier alignment fixture of claim 11, wherein the one or more grooves receive corresponding o-rings to seal between the alignment shaft and the barrel casing.

13. The carrier alignment fixture of claim 10, further comprising an alignment adjustment tool coupled to the alignment flange to provide torque and rotate the carrier alignment fixture about the first central axis.

14. The carrier alignment fixture of claim 13, wherein the alignment flange further defines one or more tool engagement holes to couple the alignment adjustment tool to the carrier alignment fixture.

15. The carrier alignment fixture of claim 13, wherein the alignment adjustment tool is a hand spanner wrench.

16. A method for aligning and supporting a component carrier disposed within a barrel casing, comprising:
inserting an alignment shaft of a plurality of carrier alignment fixtures into corresponding cylindrical bores defined the barrel casing, each alignment shaft having an eccentric key pin extending from a distal end thereof and an alignment key rotatably-mounted on each eccentric key pin;
inserting each alignment key into corresponding keyway slots defined in the component carrier;
adjustably rotating each carrier alignment fixture about a central axis of each alignment shaft;
engaging each alignment key with the corresponding keyway slots to adjust a position of the component carrier with respect to the barrel casing; and
securing the plurality carrier alignment fixtures to the barrel casing to support the component carrier therein.

17. The method of claim 16, further comprising sealing each alignment shaft against the corresponding cylindrical bores, each alignment shaft having one or more grooves defined thereon to accommodate one or more seals.

18. The method of claim 16, wherein adjustably rotating each carrier alignment fixture further comprises:
coupling an alignment adjustment tool to an alignment flange of each carrier alignment fixture; and
torquing the alignment adjustment tool.

19. The method of claim 16, wherein securing the plurality of carrier alignment fixtures to the barrel casing comprises mechanically-fastening an alignment flange of each carrier alignment fixture to the barrel casing, wherein each alignment flange defines a series of apertures configured to receive mechanical fasteners.

20. The method of claim 19, further comprising seating each alignment flange in a corresponding recess defined in the barrel casing.

* * * * *